(12) United States Patent
Kjær (10) Patent No.: US 10,865,777 B2
(45) Date of Patent: Dec. 15, 2020

(54) WIND TURBINE POWER GENERATION SYSTEM

(71) Applicant: VESTAS WIND SYSTEMS A/S, Aarhus N (DK)

(72) Inventor: Philip Carne Kjær, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/571,322

(22) PCT Filed: May 3, 2016

(86) PCT No.: PCT/DK2016/050113
§ 371 (c)(1),
(2) Date: Nov. 2, 2017

(87) PCT Pub. No.: WO2016/177376
PCT Pub. Date: Nov. 10, 2016

(65) Prior Publication Data
US 2018/0119674 A1    May 3, 2018

(30) Foreign Application Priority Data
May 6, 2015 (DK) .................... 2015 70259

(51) Int. Cl.
*F03D 9/25* (2016.01)
*H02M 5/42* (2006.01)
(Continued)

(52) U.S. Cl.
CPC ............. *F03D 9/255* (2017.02); *F03D 9/25* (2016.05); *H02M 5/42* (2013.01); *H02M 5/4585* (2013.01);
(Continued)

(58) Field of Classification Search
CPC ............ F03D 9/255; F03D 9/25; H02M 5/42; H02M 5/4585; H02J 3/386; Y02E 10/725; Y02E 10/763
See application file for complete search history.

(56) References Cited

U.S. PATENT DOCUMENTS

| | | | | |
|---|---|---|---|---|
| 4,264,951 A | * | 4/1981 | Konishi | ................ H02J 3/1878 363/35 |
| 6,856,040 B2 | * | 2/2005 | Feddersen | ............... F03D 9/255 290/44 |

(Continued)

FOREIGN PATENT DOCUMENTS

| | | |
|---|---|---|
| CN | 102171921 A | 8/2011 |
| CN | 102437808 A | 5/2012 |

(Continued)

OTHER PUBLICATIONS

International Search Report and Written Opinion for PCT/DK2016/050113 dated Jul. 13, 2016.

(Continued)

*Primary Examiner* — Tulsidas C Patel
*Assistant Examiner* — Joseph Ortega
(74) *Attorney, Agent, or Firm* — Patterson + Sheridan, LLP (57) ABSTRACT

A wind turbine power generation system comprising a rotor shaft coupled to an electrical generator which generates a power output at a first AC voltage level; a converter system that converts the power output of the generator at the first AC voltage level to a converter power output at a second AC voltage level; a transformer that converts the converter system power output at the second AC voltage level to a generation system power output at a third AC voltage level; wherein the converter system comprises a machine-side converter, a line-side converter and a DC-link. The machine-side converter is a line-commutated rectifier, and the trans- (Continued)

former is an online tap changer transformer. In another aspect, the invention resides in a wind power plant comprising at least one wind power generation system electrically coupled to a substation for onward transmission to a grid. The substation includes a point of common connection to which the one or more power generation systems electrically connected, and a transformer, wherein the transformer is an online tap changer transformer.

14 Claims, 4 Drawing Sheets (51) Int. Cl.
  *H02M 5/458* (2006.01)
  *H02J 3/38* (2006.01)
(52) U.S. Cl.
  CPC ............... *H02J 3/386* (2013.01); *Y02E 10/72* (2013.01); *Y02E 10/76* (2013.01)

(56) References Cited

U.S. PATENT DOCUMENTS

| | | | | |
|---|---|---|---|---|
| 8,234,015 B2* | 7/2012 | Bech | ............. | H02J 3/1885 |
| | | | | 700/292 |
| 2003/0227172 A1* | 12/2003 | Erdman | ............. | F03D 7/0284 |
| | | | | 290/44 |
| 2004/0202012 A1* | 10/2004 | Ferens | ............. | H02M 3/335 |
| | | | | 363/65 |
| 2009/0096211 A1* | 4/2009 | Stiesdal | ............. | H02J 3/38 |
| | | | | 290/44 |
| 2009/0206606 A1* | 8/2009 | Jorgensen | ............. | H02P 9/007 |
| | | | | 290/44 |
| 2010/0109447 A1* | 5/2010 | Achilles | ............. | H02J 3/381 |
| | | | | 307/153 |
| 2010/0139544 A1* | 6/2010 | Bo | ............. | B63G 8/08 |
| | | | | 114/337 |
| 2011/0144817 A1* | 6/2011 | Teichmann | ............. | F03D 9/255 |
| | | | | 700/287 |
| 2013/0002211 A1* | 1/2013 | Egedal | ............. | H02J 3/1828 |
| | | | | 323/208 |
| 2014/0268926 A1* | 9/2014 | Gupta | ............. | H02M 1/126 |
| | | | | 363/35 |
| 2014/0307488 A1* | 10/2014 | Brogan | ............. | H02J 3/50 |
| | | | | 363/35 |
| 2014/0327430 A1* | 11/2014 | Nielsen | ............. | F03D 7/048 |
| | | | | 324/115 |
| 2016/0065105 A1* | 3/2016 | Hardwicke, Jr. | ....... | H02J 3/386 |
| | | | | 290/44 |
| 2016/0172992 A1* | 6/2016 | Tallam | ............. | H02M 1/36 |
| | | | | 363/37 |
| 2017/0353036 A1* | 12/2017 | Gil Lizarbe | ............. | H02J 3/386 |

FOREIGN PATENT DOCUMENTS

| | | | | |
|---|---|---|---|---|
| CN | 102904274 A | | 1/2013 | |
| CN | 102979674 A | | 3/2013 | |
| GB | 2410386 A | * | 7/2005 | ............ H02J 3/1878 |
| GB | 2410386 A | | 7/2005 | |
| WO | 2016177376 A1 | | 11/2016 | |

OTHER PUBLICATIONS

Danish Search Report for PA 2015 70259, dated Dec. 16, 2015.
Chinese Office Action for Application No. 201680039950.2 dated Mar. 27, 2019.
SIPO of The People's Republic of China Notification of 2nd Office Action for Application No. 201680039950.2 dated Nov. 5, 2019.
European Examination Report for Application No. 16 721 355.2-1201 dated Sep. 4, 2020.
Intellectual Property India First Examination Report for Application 201717042173 dated Feb. 13, 2020.

* cited by examiner

WIND TURBINE POWER GENERATION SYSTEM

TECHNICAL FIELD

The invention relates to a wind turbine generator system, and also to a wind turbine power plant or wind park that incorporates one or more such generator systems.

BACKGROUND TO THE INVENTION

A common type of wind turbine generator is the three-bladed upwind horizontal-axis wind turbine generator (HAWT), in which the turbine rotor is at the front of the nacelle and facing the wind upstream of its supporting turbine tower. The blades capture the energy of the wind which is converted to mechanical torque at the rotor which is then transferred through a drive train to a generator. The generator converts the mechanical power into electrical power which is then injected into the electrical grid, which may be by way of a power electronics frequency converter which takes into account grid requirements.

There are several known topologies of power electronics frequency converter, one of which is referred to as a full-scale frequency converter. Although technically complex, such a converter topology affords full control of the output voltage frequency of the wind turbine generator, which is crucial for large scale wind turbines and wind parks in order to comply with grid codes.

However, although due to their technical complexity, wind turbine generators based on a full-scale converter topology are more costly and inefficient due to their technical complexity. This has an impact on the energy production cost which is a critical metric in the generation efficiency of a wind turbine.

There is therefore a need to reduce the cost of wind turbine generator frequency converter equipment in general and, more specifically, to reduce the cost of generation equipment featuring full-scale converter topologies. It is against this background that the invention has been devised.

SUMMARY OF THE INVENTION

In one aspect, embodiments of the invention provide a wind turbine power generation system comprising a rotor shaft coupled to an electrical generator which generates a power output at a first AC voltage level; a converter system that converts the power output of the generator at the first AC voltage level to a converter power output at a second AC voltage level; a transformer that converts the converter system power output at the second AC voltage level to a generation system power output at a third AC voltage level; wherein the converter system comprises a machine-side converter, a line-side converter and a DC-link. The machine-side converter is a line-commutated rectifier, and the transformer is an online tap changer transformer. The online tap changer transformer is also known under the alternative name of on-load tap changer (OLTC) transformer.

Beneficially, the adjustable turns ratio offered by the transformer allows variation of the AC voltage at the line side converter which can be exploited to extend the active and reactive power capability beyond that possible with a fixed turns ratio and to improve the operability of the line side converter. In combination with the line-commutated rectifier, the invention also realises a cost-reduction over conventional systems which utilise IGBT-based FSC architecture.

In this aspect of the invention, the transformer is located within the boundary defined by the generator system of the wind turbine installation itself. Typically, such generators may be grouped together in a wind turbine power plant comprising a plurality of wind turbine generators. Similar benefits could be achieved by transferring the functionality of the online tap changer transformer to the wind power plant itself, that is to say, to a substation of the power plant, instead of or in addition to, the transformer of each wind turbine generator system.

Accordingly, in a second aspect, the invention resides in a wind power plant comprising at least one wind power generation system electrically coupled to a substation for onward transmission to a grid, wherein the power generation system includes: a rotor shaft coupled to an electrical generator which generates a power output at a first AC voltage level; a converter system that converts the power output of the generator at the first AC voltage level to a converter power output at a second AC voltage level; a transformer that converts the converter system power output at the second AC voltage level to a generation system power output at a third AC voltage level; wherein the converter system comprises a machine-side converter, a line-side converter and a DC-link, and wherein the machine-side converter is a line-commutated rectifier. The substation includes a point of common connection to which the one or more power generation systems are electrically connected, and a transformer, wherein the transformer is an online tap changer transformer. It will therefore be understood, that this aspect of the invention in a sense provides an alternate configuration to the wind turbine generator of the first aspect, in which the functionality of the transformer with adjustable turns ratio is primarily at the substation level, rather than at the level of each wind turbine generation system.

In the above wind power plant, although the transformer of the power generation system may be a transformer with a fixed turns ratio, in one embodiment, the transformer of the power generation system is an online tap changer transformer.

In both aspects, the line-commutated rectifier may be a six-pulse bridge configuration which, accordingly, applies to a three phase power generation system. Moreover, the line-commutated rectifier may be based on thyristor devices and, as such, may be phase-controlled.

In contrast to the machine-side converter, the line-side converter may be a force-commutated converter, which may alternatively be referred to as a 'voltage-source converter'. This may also be a three-phase system if necessary, although the invention is applicable to single-phase generation systems.

With reference to the power generation system in the above aspects of the invention, the online tap changer transformer may be configured to provide a voltage on the DC-link that is lower than the peak value of the first AC voltage level.

In the embodiments, the online tap changer transformer may be controlled in dependence on at least one of: generator speed, wind speed and grid voltage, and may be controlled using a combination of these factors.

The embodiments of the invention are applicable to generation systems in which the generator is a permanent-magnet generator or a wound-field synchronous generator.

For the avoidance of doubt, it should be noted that preferred and/or optional features of the first aspect of the invention may be combined with the second aspect of the invention.

BRIEF DESCRIPTION OF THE DRAWINGS

Embodiments of the invention will now be described by way of example only to the following drawings, in which.

DETAILED DESCRIPTION OF EMBODIMENTS OF THE INVENTION

Figure 1:
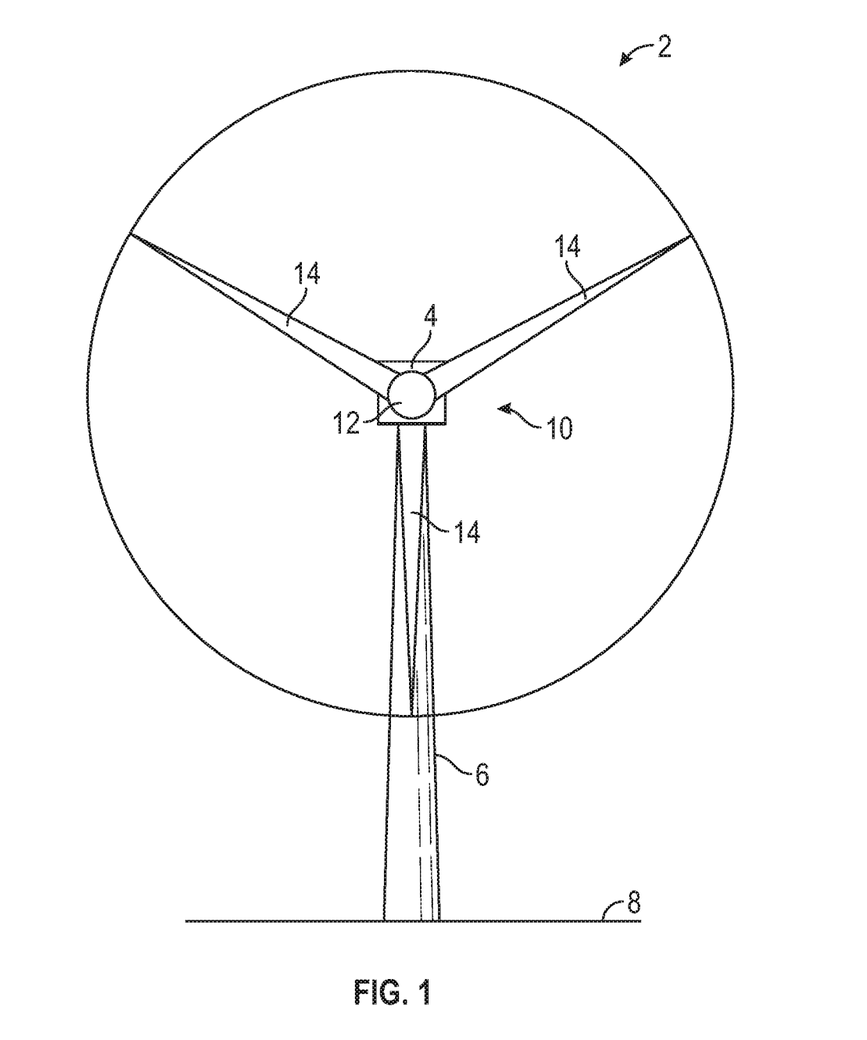
FIG. 1 is a front view of a wind turbine.

With reference to FIG. 1, a wind turbine installation 2 includes a wind turbine module 4 mounted on top of a tower 6 which is itself fixed into a foundation 8 in the usual manner. The wind turbine module 4 houses and supports the various power generating components of the wind turbine installation 2, one of which is a rotor 10 comprising a hub 12 and three blades 14 that define a rotor disc 16. The wind turbine installation shown in FIG. 1 is a horizontal axis wind turbine (HAWT) which is a common type of system, although other types exist, to which the invention is also applicable.

As is known, the flow of wind acting on the blades 14 spins the rotor 10 which drives the power generation system housed in the wind turbine module 4. The power generation system is shown in more detail in FIG. 2, and is labelled generally as reference '18'.

Figure 2:
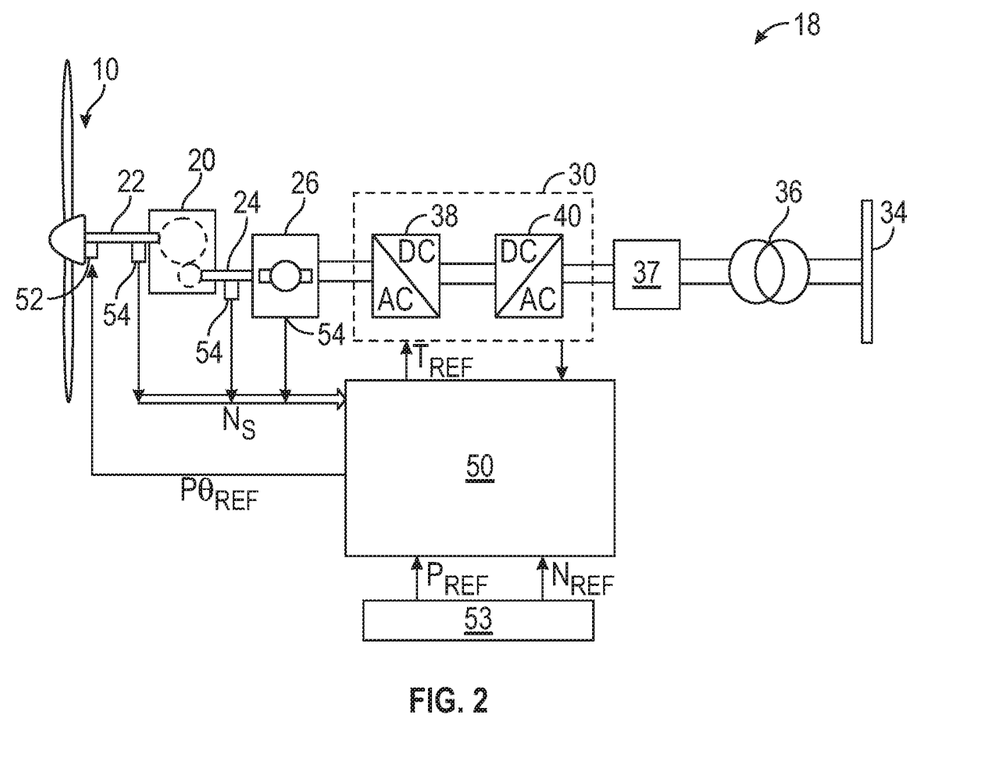
FIG. 2 is a schematic view of a power generation system of the wind turbine in FIG. 1.

FIG. 2 illustrates an example of a power generation system architecture that is represented schematically and serves to put the invention into its proper context. It should be appreciated that the power generation system 18 includes features that are significant for this discussion, but it should be appreciated that many other conventional features are not shown here for brevity, but their presence is implied. Also it should be noted that the specific architecture discussed here is used as an example to illustrate the technical functionality of the invention, and so the invention may be implemented by a system having a different specific architecture, as will become apparent.

Returning to the figure, the rotor 10 drives a transmission 20 by way of an input drive shaft 22. Although the transmission 20 is shown here in the form of a gearbox, it is also known for wind turbines to have a direct-drive architecture without a gearbox. The transmission 20 has an output shaft 24 which drives a generator 26 for generating electrical power. Three phase electrical power generation is usual in utility scale wind turbine systems, but this is not essential for the purpose of this discussion. For the avoidance of doubt, it should be noted that the generator 26 may be a permanent-magnet generator or a wound-field synchronous generator, for example.

The generator 26 is connected to a frequency converter 30 by a suitable three-phase electrical connector such as a cable or bus 32. The frequency converter 30 is of conventional architecture and, as is known, converts the output frequency and voltage of the generator 26 to a voltage level and frequency that is suitable for supplying to an electrical grid 34 via a step-up transformer 36 and filter 37. It will be appreciated that the specific architecture described here is a two-level back-to-back forced-commutated voltage source full scale frequency converter (FSC) system, which includes a machine-side converter 38 and a line-side converter 40 which are coupled via a DC link 42. Both of the converters are in essence identical and are voltage-source converters in which forced-commutated IGBT power electronic semiconductors are controlled to regulate the power flow through the converter from the generator to the line-side. Such a topology provides significant benefits for power generation since it enables full control of generated power (active and reactive components) and also frequency, which means that it is able to contribute to complying with the grid connection requirements, also known as the 'grid code'.

To put the power generation system into context, a brief discussion of the control strategy of the wind turbine will now be provided by way of example. As is known, variable-speed wind turbines typically operate under two main control strategies: below-rated power and above-rated power. As is known, the term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 and 17 m/s, but may be different depending on the size of the wind turbine. In this operating region, the wind turbine module 4 is operable to control the rotor speed so as to maximise the energy captured from the wind. This is achieved by controlling the rotor speed so that the tip speed ratio is at an optimum value, namely between 6 and 7. To control the rotor speed, the wind turbine module 4 controls the generator torque so as to track a power reference, as will be described.

Above-rated power occurs when the wind speed has increased to, or exceeds, the rated wind speed. In this operating condition, the objective of the wind turbine module 4 is to maintain a constant output power. This is achieved by controlling the generator torque to be substantially constant, so as to track a constant power reference, but varying the pitch angle of the blades which adjusts the resulting lift and drag force of the blade in the rotor plane. This will control the torque transferred to the rotor shaft so that the rotational speed, and also the generated power of the system, is kept constant below a set threshold.

In order to achieve the below-rated power and above-rated power control objectives, the wind turbine module 4 is equipped with a controller 50. The controller 50 is operable to control the frequency converter 30 via torque reference $T_{REF}$ to influence the torque exerted on the rotor 10 by the generator 26, and also to control the pitch of the blades via pitch reference $P\theta_{REF}$, and thereby the speed of the rotor 10, through a blade pitch adjustment system 52.

The controller 50 receives a plurality of control inputs, but two control inputs are shown specifically here: a rotor speed reference parameter $N_{REF}$ and a power reference parameter $P_{REF}$ which are provided by a higher level controller, such as an operational sequence controller 53 either directly to the controller 50 or through a data distribution network based on a suitable protocol, such as Ethernet. The controller 50 also receives monitoring inputs so that it can determine the correct operation of the components under its control. Specifically, the controller 50 receives a machine speed parameter $N_S$ which may come from speed sensors 54 associated with the rotor, the transmission, or the generator, and a power output parameter $P_S$ from the frequency converter 30.

During below-rated conditions, the control system 50 is operable primarily to control the generator torque, which is associated with, and calculated from, the power reference $P_{REF}$, by outputting a demanded torque signal $T_{REF}$ to the frequency converter 30 in order to track the power reference $P_{REF}$. Similarly, at operating conditions above-rated power, the control system 50 is operable to hold the generator torque substantially constant (and, therefore, to track the constant power reference) but to provide control input $P\theta_{REF}$ to the pitch control system 52 to modulate, collectively, the pitch angles of all three blades of the rotor 10.

Returning to the full-scale converter topology as shown in FIG. 2, it has been mentioned that such a topology provides significant benefits for power generation since it enables full control of generated power (active and reactive components) and frequency. However, this converter topology also presents challenges. One factor is that although such topologies offer operational advantages, they are technical complex which increases the cost of implementation, and they also tend to exhibit somewhat high commutation and conduction losses during operation, which reduces the overall power generation efficiency of the generation system. Further, the semiconductor ruggedness against faults, such as DC link short-circuits, can be less than ideal. Further, the pulse-width modulation of the converters generates harmonics in the AC voltages and AC currents which either require filtering by dedicated filter components or lead to added losses in the attached transformer and generator, which can increase cost weight and complexity.

Against the context of the full-scale converter wind turbine power generation system described above and illustrated in FIG. 2, a modified power generation system 60 will now be described with respect to FIG. 3.

Figure 3:
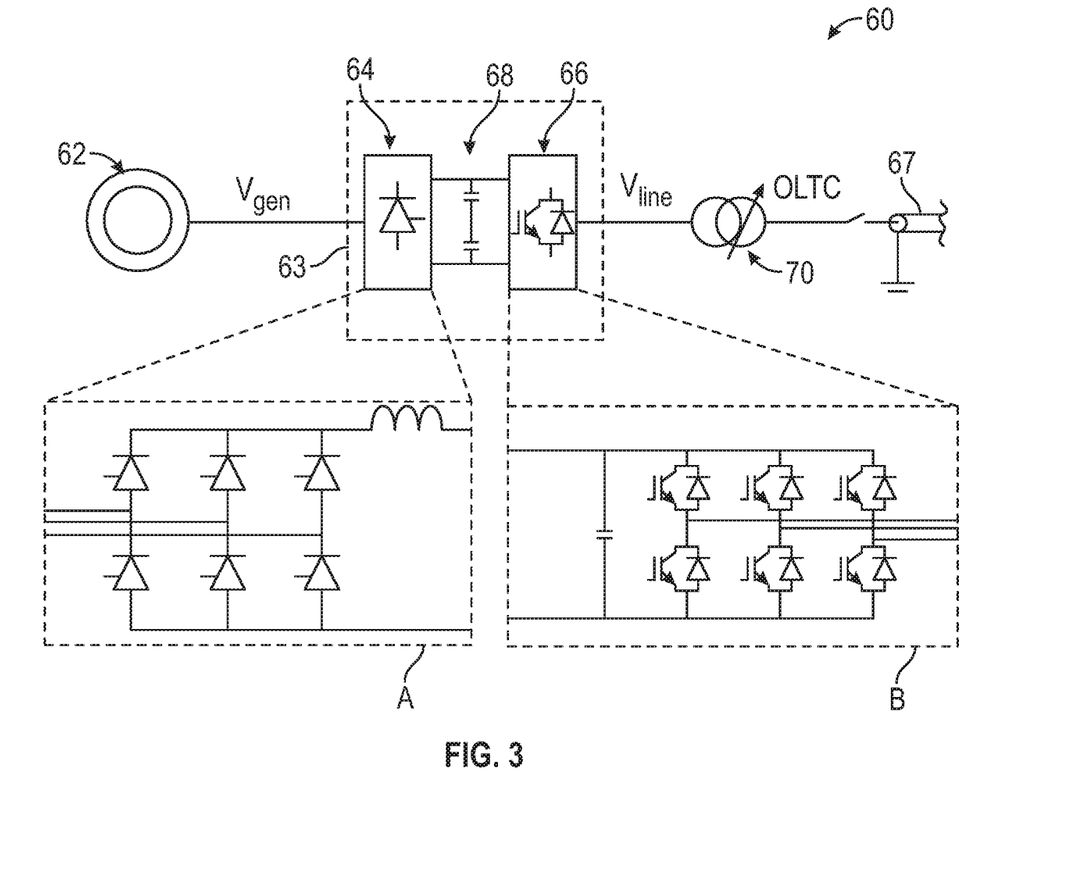
FIG. 3 is a schematic view of a power generation system based on a full-scale converter (FSC) topology according to an embodiment of the invention.

It should be noted that the power generation system 60 of FIG. 3 is similar in topology and operation to the power generation system 18 of FIG. 2. Therefore, repeated explanation of the principles of operation will not be provided for reasons of brevity, and the discussion will focus on the key differences of the power generation system 60 and the effects that result from those differences.

Referring now to FIG. 3 the power generation system 60 has, in the same way as the system in FIG. 2, a full-scale converter architecture and, as such, includes a generator 62, a full scale converter system 63 comprising a machine-side converter (MSC) 64, which is sometimes known as a generator side converter, a line-side converter (LSC) 66, which is sometimes knows as a grid side converter due to its proximity to the distribution grid 67 compared to the machine-side converter 64, a DC-link 68 coupling the machine-side converter 64 and the line-side converter 66, in a known way, and a transformer 70 which steps up the line-side voltage ($V_{line}$) at the output of the line-side converter 66 to a level appropriate for the electrical grid 67, be it at a level appropriate for a so called 'internal grid' within a wind park) or at a level where it feeds the mains distribution grid directly (typically around 30-38 kV depending on country). Not shown in FIG. 3 is a DC-link reactor which may also be employed to improve the DC voltage profile of the DC-link 68.

The machine-side converter 64 and the line-side converter 66 can be considered to carry out the functions that are well understood in the art, namely that the machine-side converter 64 converts the AC generated voltage and frequency of the generator 62 to a DC voltage on the DC-link 68, whilst the line-side converter 66 converts the DC voltage level to an AC voltage and frequency electrically upsteam of the transformer 70.

However, a key feature of the power generation system 60 is that the transformer 70 is a device known as an Online Tap Changer (OLTC) transformer, more simply, just 'OLTC'. Said device is also known under the alternative name of On-Load Tap Changer (OLTC) transformer. In principle, this type of device is known in the art within the context of power transmission systems and, in essence, is a transformer having several tapping points which enable the turns ratio of the device to be varied, and so can therefore be considered to have an adjustable turns ratio. Since OLTCs are devices that are known in power transmission engineering, a full discussion of the principle of operation of such devices will not be provided here for brevity. However, it should be noted that suitable examples of tap changers can be considered to be the range of oil-type OLTCs and vacuum-type OLTCs marketed by Maschinenfabrik Reinhausen GmbH, 93059, Germany under the trade marks OILTAP® and VACU-TAP®.

In the context of the wind turbine power generation system 60 of the embodiment of FIG. 3, the OLTC 70 confers significant benefits. For example, one benefit is that the OLTC 70 enables improved output voltage regulation from the generation system 60. This can be used to increase the grid voltage support capability of traditional devices such as STATCOMs. Furthermore, the OLTC 70 may be used to protect, or insulate, the generation system 60 from voltage imbalances on the grid. In more detail, the adjustable turns ratio offered by the OLTC 70 allows variation of the AC voltage 'seen' by the line-side converter 66. Adjustment of this AC voltage, by adjustment of the tap position of the OLTC 70, can be exploited to extend the active and reactive power capability of the line-side converter 66 beyond that possible with a transformer with fixed turns ratio. Conventionally, a line-side converter based on a forced-commutated voltage-source converter will be operated with a DC-link voltage at or below the safe upper limit of the converter's semiconductors. At the same time, the voltage-source converter operating principle requires the DC-link voltage to be higher than the highest AC voltage. Consequently, at some higher level of AC voltage, the voltage-source converter ceases to be controllable, and must block commutation, and eventually be disconnected from the AC line. To counteract blocking and tripping in such situations, the OLTC can perform effective reduction of the AC voltage seen by the line-side converter 66.

Further, as is conventional, when grid voltage is low, the line-side converter 66 must increase its output AC current to maintain the active and reactive powers unchanged. The AC current generated by the line-side converter 66 must be controlled to stay at or below the safe upper limit of the converter's semiconductors. Consequently, at some lower level of AC voltage, the voltage-source converter reaches its maximum AC current level and can no longer deliver the commanded active and reactive power. To extend the operating range—i.e. delivery of commanded power during reduced grid voltage—the OLTC 70 can perform effective increase of the AC voltage seen by the line-side converter 66 that would not be possible with a transformer having a fixed turns ratio.

In a conventional converter used in a full scale converter system (also referred to as a Type 4 wind turbine system), both the machine-side converter and the line-side converter are essentially identical in that they typically use an IGBT-based converter, referred to as a voltage-source converter, or force- or self-commutated converters. Since these converters are based on IGBT switching devices or 'switching semi-conductors', they are highly controllable as the switches can be commutated at elevated frequency which moves the generated harmonic content in AC voltage and current to higher frequency, which in turn may be easier to filter . . . . A characteristic of the voltage-source converter is that they operate in a 'step up' mode, in which the DC side voltage of an AC-DC or DC-AC converter is higher than the peak AC voltage level. So, considering an example of a machine-side converter running at rated load, the input AC voltage (i.e. phase-phase RMS voltage level) may be 480V and the DC-link voltage may be 750V. It should be noted that the specific voltage values given here are to illustrate the principle, but are not intended to be limiting.

Conversely, for a line-side converter, the voltage is stepped down from the DC-link to the line output voltage of the line-side converter. By way of an example, if the grid voltage is at a nominal 400V, the DC-link may be around 750V.

As will be appreciated, therefore, the voltage level on the DC-link 68 is required to be relatively high in order that the voltage-source machine-side and line-side converters can operate correctly. However, in the power generation system 60 of this embodiment of the invention, the OLTC 70 is used to control the AC voltage on the line-side converter, in turn controlling the voltage on the DC-link 68, to enable the machine-side converter 64 to be a phase-controlled, line commutated rectifier/converter that uses thyristors instead of IGBTs as the machine-side converter's semiconductors. As is known in the art, phase-controlled rectifiers are also known as line-commutated rectifiers, and operate on the principle that the voltage conversion process relies on the line voltage ($V_{gen}$) of the AC line input from the generator 62 to effect switching from one switching device to another. For the thyristor to turn on and start conduction a gate-signal must be present while the thyristor is forward biased. The thyristor turns off when it is reverse biased and current decays to zero. The commutation frequency follows the frequency of the connected AC voltage. Any retardation of the gate signal will delay turn-on and thus reduce the amount of power transferred during each conduction interval for the thyristor. From now on, therefore, the machine-side converter 64 will be referred to as the line-commutated rectifier 64, where appropriate For a three phase system as is typical in a wind turbine power generation system, the line-commutated rectifier 64 may be in the form of a six-pulse bridge or 'Graetz' bridge configuration, as is known in the art. In FIG. 3, the thyristor-based switch devices is illustrated by the thyristor symbol associated with the line-commutated rectifier 64, as compared to the IGBT symbol associated with the line-side converter 66. Furthermore, the bridge topology is shown in more detail in the inset panel labelled 'A', whilst the IGBT converter topology is shown in the inset panel labelled 'B'.

Line-commutated rectifiers require a DC output voltage level that is lower than the AC line input voltage level. Voltage-source DC-AC converters require an AC voltage level that is lower than the DC level. Beneficially, therefore, the OLTC transformer 70 is configurable so that the voltage on the DC-link 68 can be lowered in a controlled manner by controlling the line voltage $V_{line}$ at the output of the line-side converter 66 whilst keeping the output voltage of the OLTC transformer 70 substantially constant. In more detail, on the basis of a steady state grid voltage, a change in the tapping point of the OLTC 70 functions to reduce the voltage required at the line-side of the line-side converter 66 in order to support the required output voltage of the OLTC 70. As a result of this, the reduced voltage at the output of the line-side converter 66 requires a lower voltage on the DC link 68. Since the voltage input into the line-commutated rectifier 64 varies with the speed and desired power of the generator, and the line voltage $V_{line}$ is substantially constant, albeit varying slightly around a nominal voltage level, the OLTC 70 can be controlled in dependent on rotor/generator speed and power in order to maintain an acceptably low DC link voltage so that controlled rectification can take place even at comparatively low rotor speeds.

There are several benefits of using a line-commutated rectifier as the machine-side converter 64 instead of a forced-commutated voltage-source converter based on IGBTs. Firstly, a line-commutated rectifier is more cost effective piece of electronics which enables a reduction of complexity of the power generation system, both in terms of power electronics equipment.

The line-commutated rectifier offers lower conversion losses than the voltage-source converter, both conduction losses and in particular commutation losses, as the commutation frequency is much reduced. The commutation frequency has an effect on the losses incurred by the generator, too. Depending on the frequency, the generator losses with the line-commutated rectifier may be lower than with the voltage-source converter. The thyristors further offer higher surge current capability that their IGBT counterparts, which is advantageous in case of short-circuit faults in the DC link.

A skilled person would understand that variations and modifications could be made to the specific embodiments described above without departing from the inventive concept as defined by the claims.

It should be appreciated that in the embodiments described above, the thyristor-based phase-controlled, line-commutated rectifier 64 allows control over the generator power, so that, for example, generator power can be reduced under certain circumstances, which may be when the wind turbine is operating at above rated wind speeds. However, it is also envisaged that diodes could be used instead of the thyristors under certain conditions. Such a topology would still be line-commutated since it is the line voltage that effects the commutation from one device to the next, although the turn on point for diodes is uncontrolled.

Figure 4:
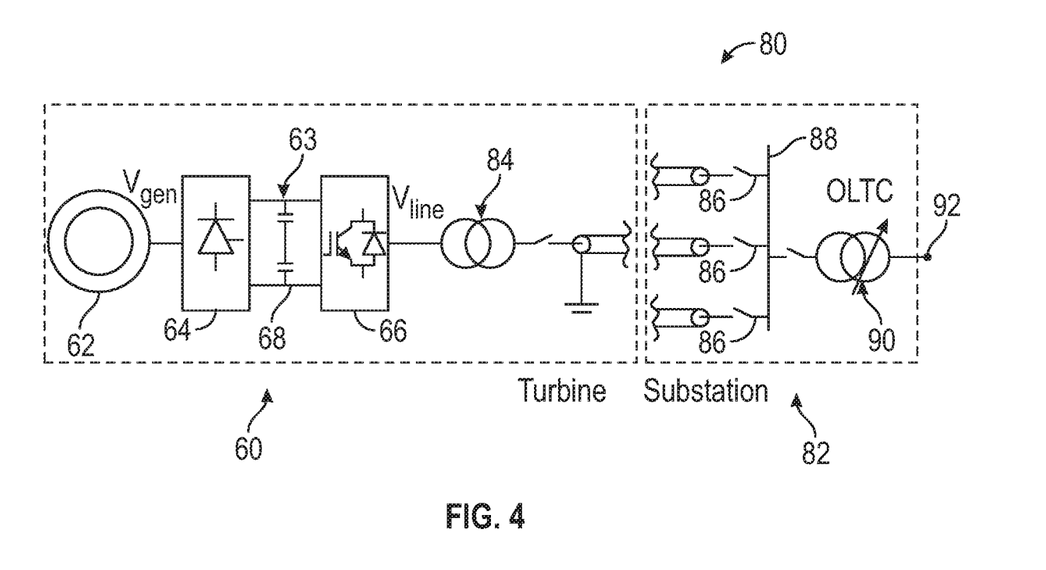
FIG. 4 is a schematic view of a wind park including a at least one power generation system based on a full-scale converter (FSC) topology, according to another embodiment of the invention.

With reference to FIG. 4, an alternative embodiment is shown in which the position of the OLTC is different with respect to the embodiment of FIG. 3. The embodiment of FIG. 4 shares many similarities with the embodiment of FIG. 3 so, where appropriate, the same reference numerals will be used to refer to common parts.

In the embodiment of FIG. 3, the OLTC 70 is connected between the converter system 63 and the electrical grid 67. Here the grid 67 could either be an 'internal' electrical grid that is local to a wind park and to which multiple wind turbine generator systems are connected upsteam of a wind park substation, or it may be a direct connection to a national distribution or transmission grid.

The embodiment of FIG. 4 illustrates an arrangement for a wind park or wind power plant 80, that includes at least one wind turbine power generation system 60 connected to a substation 82. The substation 82, in turn, is connected to a national distribution or transmission grid 92.

Referring firstly to the power generation system 60, it should be appreciated that the system is similar to that in FIG. 3 in that is includes a generator 62 and a full scale converter system 63 and, importantly, the converter system 63 includes a machine-side converter 64 that is a line-commutated rectifier and a line-side converter 66 that is a force-commuted voltage-source converter. Since the converters 64, 66 are the same as those in FIG. 3, the detailed views given in the inset panels A, B are not provided here.

In this embodiment, the power generation system 60 includes a transformer 84 that has a fixed turns ratio, and is not an OLTC as in the embodiment of FIG. 3. The voltage regulation function previously carried out by the OLTC in FIG. 3 is, instead, now located in the substation 82.

Referring now specifically to the configuration of the substation 82, it will be seen that the substation 82 receives three power line inputs 86, and these can be considered to come from respective wind turbine power generation systems similarly configured to the system 60. Each of the power line inputs 86 coupled to a point of common connection 88, or 'PCC' which in turn feeds to a transformer 90, having the function of stepping up the 'internal' wind park grid voltage as read at the PCC 88, to a voltage level suitable for onward distribution to the national grid 92. In this embodiment, however, the transformer 90 is an OLTC in which the turns ratio is configurable. As such, in the embodiment of FIG. 4, the same technical benefits are achievable as in the embodiment of FIG. 3. That is to say, the OLTC 90 is operable to enable a lower voltage level upstream of the OLTC 90, i.e. within the internal grid, whilst still supplying the grid 92 with a voltage level determined by the grid. Following this through, the lower voltage enabled at the internal grid upstream of the PCC 88 is further stepped down by the transformer 84 that is part of the power generation system 60 which enables the voltage of the DC-link 68 to be set at a level which makes it possible for the line-commutated rectifier 64 to be used as the machine-side converter. In terms of controlling the OLTC 90, since there are several power generation systems in the wind park, it is envisaged that the tap position of the OLTC 90 may be controlled in dependence on an averaged value of generator speed taken from all of the systems. Alternatively, the OLTC 90 may be controlled in dependence on wind speed. Alternatively, the OLTC 90 may be controlled in dependence on requested power, or grid voltage level, or a combination of the above. The objective is to control the OLTC 90 to reduce the line-side converter AC voltage and in turn the DC link voltage enough that the line-commutated rectifier 64 can supply the requested power at the particular wind speed, generator speed and grid AC voltage. It is in particular at low wind speed, low generator speeds that voltage reduction is required.

Since line-commutated rectifiers are more cost effective that IGBT-based devices, the embodiments of FIGS. 3 and 4 provide a much improved cost of production compared with known wind parks in which the power transformers for i) each of the wind turbines and ii) the substation, are transformers having fixed turns ratio.

It should be noted that although the line controlled rectifier 64 referred to above has been describe as having a six-pulse bridge topology, alternate topologies would also be apparent to the skilled person, for example a twelve- eighteen- or twenty-four-pulse bridge, and general reference to 'line-commutated rectifier' should be interpreted as covering all such alternatives.

As a variant of the embodiment of FIG. 4, it should be noted that transformer 84, which is a fixed turns ratio transformer, could instead be a OLTC transformer, that is to say, like the system in FIG. 3, which would provide the possibility of even further extending the voltage regulation capability.

The use of thyristors in a phase-controlled rectifier offers improved cost, lower conversion losses, a harmonic spectrum with content at lower frequencies, and surge current robustness.

The invention claimed is:

1. A wind turbine comprising:
   a rotor shaft coupled to an electrical generator that generates a power output at a first AC voltage level;
   a converter system that converts the power output of the electrical generator at the first AC voltage level to a converter power output at a second AC voltage level, wherein the converter system comprises a machine-side converter, a line-side converter, and a DC-link coupling the machine-side converter and the line-side converter, and wherein the machine-side converter is a line-commutated rectifier; and
   an online tap changer transformer that converts the converter power output at the second AC voltage level to a wind turbine power output at a third AC voltage level of an electrical grid connected to the wind turbine, wherein the online tap changer transformer is controlled in dependence on at least one of: a measured speed of the electrical generator, and a measured wind speed.

2. The wind turbine of claim 1, wherein the line-commutated rectifier has a six-pulse bridge configuration.

3. The wind turbine of claim 1, wherein the line-commutated rectifier is phase-controlled.

4. The wind turbine of claim 1, wherein the line-side converter is a force-commutated converter.

5. The wind turbine of claim 4, wherein the force-commutated converter is a three-phase converter.

6. The wind turbine of claim 1, wherein the online tap changer transformer is configured to control a voltage on the DC-link to not exceed a peak value of the first AC voltage level.

7. The wind turbine of claim 1, wherein the electrical generator is a permanent-magnet generator.

8. The wind turbine of claim 1, wherein the electrical generator is a wound-field synchronous generator.

9. The wind turbine of claim 1, wherein the line-commutated rectifier comprises at least one thyristor.

10. The wind turbine of claim 1, wherein the converter system is a full-scale converter system.

11. The wind turbine of claim 1, wherein the online tap changer transformer is controlled further in dependence on a grid voltage level.

12. The wind turbine of claim 1,
    wherein the wind turbine is included in a wind park with one or more other wind turbine, and
    wherein the electrical grid comprises an internal grid of the wind park.

13. The wind turbine of claim 1, wherein the electrical grid comprises a mains distribution grid.

14. A wind power plant comprising:
    a plurality of wind turbines connected with an internal grid, wherein the plurality of wind turbines comprises a first wind turbine comprising:
    a rotor shaft coupled to an electrical generator that generates a power output at a first AC voltage level;
    a converter system that converts the power output of the electrical generator at the first AC voltage level to a converter power output at a second AC voltage level, wherein the converter system comprises a machine-side converter, a line-side converter, and a DC-link coupling the machine-side converter and the line-side converter, and wherein the machine-side converter is a line-commutated rectifier; and
    an online tap changer transformer that converts the converter power output at the second AC voltage level to a wind turbine power output at a third AC voltage level of the internal grid, wherein the online tap changer transformer is controlled in dependence on at least one of: a measured speed of the electrical generator, and a measured wind speed.

\* \* \* \* \*